United States Patent
Finetti et al.

(10) Patent No.: US 7,168,560 B2
(45) Date of Patent: Jan. 30, 2007

(54) CONTINUOUS STRIP OF CONTAINERS HAVING TRACTION PINS

(75) Inventors: Primo Finetti, Mirandola (IT); Andrea Bartoli, Reggio Emilia (IT)

(73) Assignee: Sarong Societa' per Azioni, Reggiolo (IT)

( * ) Notice: Subject to any disclaimer, the term of this patent is extended or adjusted under 35 U.S.C. 154(b) by 158 days.

(21) Appl. No.: 10/502,327

(22) PCT Filed: Jan. 22, 2003

(86) PCT No.: PCT/IB03/00138

§ 371 (c)(1), (2), (4) Date: Jul. 23, 2004

(87) PCT Pub. No.: WO03/062087

PCT Pub. Date: Jul. 31, 2003

(65) Prior Publication Data

US 2005/0130820 A1 Jun. 16, 2005

(30) Foreign Application Priority Data

Jan. 24, 2002 (IT) .............................. MO02A0016

(51) Int. Cl.
*B65D 85/67* (2006.01)
*B65D 30/00* (2006.01)
*B65D 9/08* (2006.01)
*B65D 43/04* (2006.01)
*B65D 43/10* (2006.01)

(52) U.S. Cl. ..................... 206/390; 206/820; 383/37; 53/459; 53/562; 53/574

(58) Field of Classification Search ................ 206/390, 206/529, 820; 53/450–456, 559, 459, 562, 53/574; 383/37

See application file for complete search history.

(56) References Cited

U.S. PATENT DOCUMENTS

| | | | | |
|---|---|---|---|---|
| 2,343,064 A | * | 2/1944 | Kjorsvik ..................... | 206/390 |
| 2,420,983 A | * | 5/1947 | Salfisberg ................... | 206/820 |
| 4,588,090 A | * | 5/1986 | Spuck et al. ................. | 53/453 |
| 4,774,797 A | * | 10/1988 | Colamussi et al. .......... | 53/459 |
| 4,897,074 A | | 1/1990 | Knight | |
| 4,967,539 A | * | 11/1990 | Hansen ........................ | 53/453 |
| 5,719,348 A | * | 2/1998 | Bill et al. .................... | 206/820 |

(Continued)

FOREIGN PATENT DOCUMENTS

DE 10 84 558 B 6/1960

(Continued)

*Primary Examiner*—Bryon P. Gehman
(74) *Attorney, Agent, or Firm*—Nixon & Vanderhye P.C.

(57) ABSTRACT

In a continuous strip of containers, the latter are distributed stepwise from one another according to a longitudinal axis of the strip, two adjacent containers being separated by a step. From one longitudinal edge zone traction pins protrude laterally that are intended in use to interact by contact with an advancing device for advancing the strip. For each traction pin a corresponding opposing projection is prearranged that protrudes from the opposite side of the longitudinal edge zone. The strip is designed to be conveyed along an advancing direction that is parallel to a longitudinal axis thereof. Each opposing projection is located slightly forward in relation to said advancing direction, compared with the relative traction pin, at an axial distance that is shorter than the step between the containers.

10 Claims, 1 Drawing Sheet

U.S. PATENT DOCUMENTS

| | | |
|---|---|---|
| 5,729,963 A | 3/1998 | Bird |
| 5,767,433 A * | 6/1998 | Bill et al. .................... 206/820 |
| 6,591,586 B1 * | 7/2003 | Pape ........................... 53/459 |
| 7,048,441 B2 * | 5/2006 | Pape ........................... 383/37 |
| 2002/0116904 A1 * | 8/2002 | Palm ........................... 53/450 |

FOREIGN PATENT DOCUMENTS

| | | |
|---|---|---|
| DE | 12 27 638 B | 10/1966 |

* cited by examiner

US 7,168,560 B2

CONTINUOUS STRIP OF CONTAINERS HAVING TRACTION PINS

This application is the US national phase of international application PCT/IB03/00138 filed 23 Jan. 2003, which designated the US and claims priority to IT Application No. MO2002A000016 filed 24 Jan. 2002. The entire contents of these applications are incorporated herein by reference.

The present invention concerns a continuous strip of containers.

Specifically, but not exclusively, this invention can be used in a machine for forming, filling, sealing and cooling containers arranged in a continuous strip in heat-sealable and thermoformable plastic material.

In prior-art machines of this type the strip of containers is conveyed by an advancing device operating with a thrust action, comprising a running guide defined by two guide walls that contain a longitudinal edge zone of the strip. The device furthermore comprises one or more flexible dragging members arranged in a closed ring and each member provided with one or more thrust protrusions. The latter are provided to interact by contact with traction pins that are pre-formed on the strip, which pins protrude laterally from a side of the edge zone of the strip contained in the running guide. From the opposite side opposing projections protrude laterally which oppose to strip flexure due to the thrust action of the thrust protrusions carried by the flexible dragging member.

Normally, this thrust-action advancing device is used to convey the strip of containers, that has already been filled and sealed, inside a refrigerator to cool the filling material.

One of the disadvantages of a thrust-action advancing device of the aforementioned type is the fact that it can ensure the strip advancing only if the strip has relatively high flexure stiffness; otherwise, the thrust protrusion that acts on the traction pin causes the strip to bend laterally to such an extent as the same thrust protrusion even loses its engagement on the pin, thereby making the device ineffective.

The main object of the present invention is to provide a strip of containers, appliable to a thrust-action advancing device, by means of which said problem can be solved.

An advantage of the invention is that it is possible to make a simple and cheap strip of containers.

Another advantage is that a strip of containers is made available, which ensures a high reliability of the thrust-action advancing device in which the strip is used.

These objects and advantages and yet others are achieved by this invention, as it is characterized by the claims set out below.

Further features and advantages of the present invention will be better disclosed in the following detailed description of an embodiment thereof, shown in the exemplifying and not limiting accompanying drawings.

In the abovementioned figures, 1 indicates a continuous strip of containers 2 in which the strip has a preset width and an undefined length and in which the containers 2 are arranged in sequence, at a constant step P, one after the other, according to a longitudinal axis of the strip. The containers, in the case in point, are full and sealed. The strip can be made, for example, by a machine for forming, filling and sealing at least one strip of containers starting with one or more continuous webs unwound by reels and made into film of heat-sealable and thermoformable plastic material.

Figure 2:
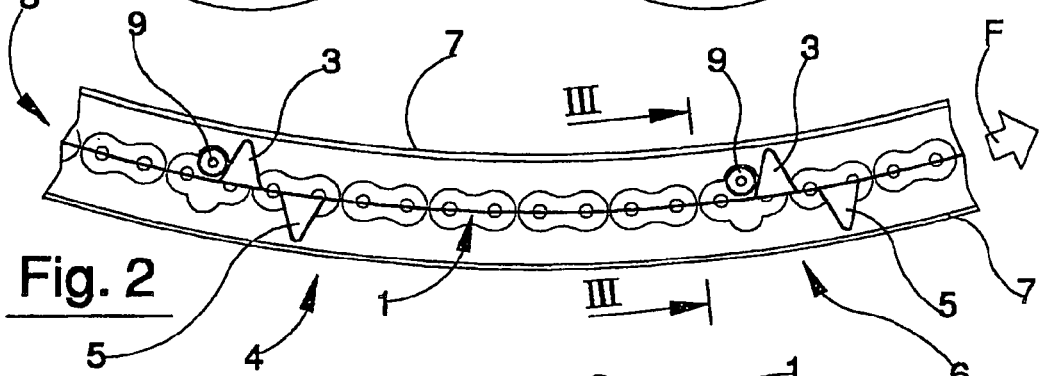
FIG. 2 is a plan view from above of an advancing device applied to the strip in FIG. 1.
Figure 3:
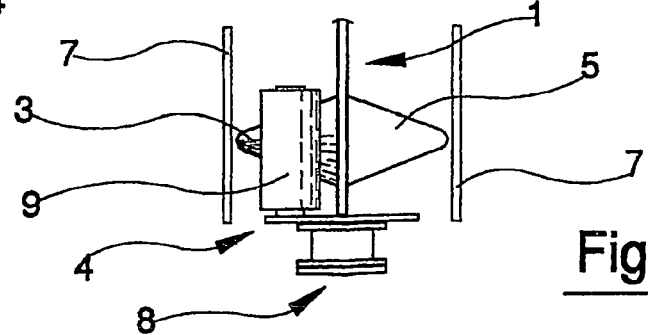
FIG. 3 is a section taken along the axis III—III of FIG. 2.

The strip 1 of containers has a longitudinal edge zone from which traction pins 3 protrude laterally that in use interact by contact with an advancing device 4 for advancing the strip. The prior-art device is shown in FIGS. 2 and 3. The strip is designed to be conveyed according to an advancing direction F that is parallel to its longitudinal axis.

The strip 1 comprises, for each traction pin 3, a corresponding opposing projection 5 that protrudes from the opposite side of the longitudinal edge zone. In the case in point disclosed here, the traction pins 3 protrude to the left (with reference to the advancing direction F), while the opposing projections protrude to the right.

Each opposing projection 5 is located further forward, in relation to the advancing direction F, compared with the relative traction pin 3 at an axial distance shorter than the step P between the containers. The axial distance between the opposing projection 5, located further forward, and the relative traction pin 3, located further back, could be significantly shorter than the step P between the containers: in particular it is shorter than at least half of the step P. The opposing projections 5 and the traction pins 3 may be made by thermoforming; they are substantially formed by deforming the film material with which the containers are formed and along the same forming line as the containers.

The number and the distribution of the traction pins is such that a traction pin 3 and a corresponding opposing projection 5 are associated with each container 2. Both the traction pins 3 and the opposing projections 5 are distributed with a step that is equal to the step P between the containers.

Figure 1:
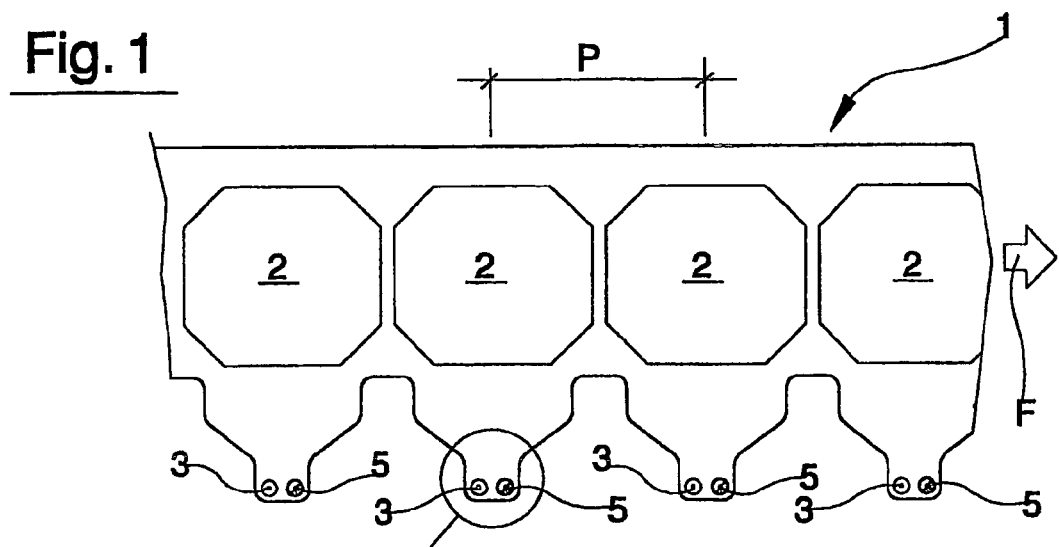
FIG. 1 is a side view of a section of a strip of containers according to this invention.
Figure 1A:
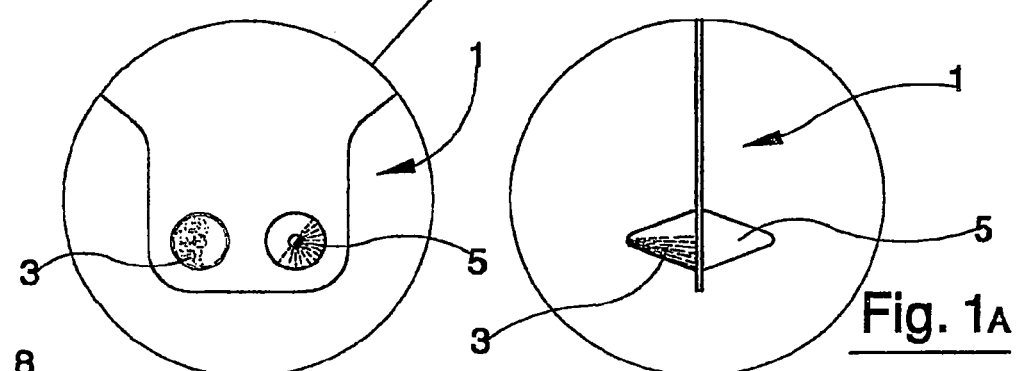
FIG. 1A is a left side view of the enlarged detail of FIG. 1.

The edge of the longitudinal edge zone, i.e. the strip edge near which there are the traction pins and the opposing projections, is configured in a sinuous manner in such a way that the longitudinal edge zone alternates, with a step that is equal to the step P between the containers, a full zone, i.e. a zone occupied by the material of the strip 1, and an empty zone, i.e. a zone free of the material of the strip, as shown in this case in FIG. 1. Each traction pin 3, and each relative opposing projection 5, are both situated on the same full zone of the edge zone. Each full zone has a traction pin 3 and the relative opposing projection 5.

The longitudinal edge zone, in which the traction pins 3 and the opposing projections 5 are prearranged, is a flat and thin zone without the swollen and containing parts (in which the filling material is held) of the containers.

The strip of containers is in particular, but not only, used within the advancing device 4. The latter comprises an advancing guide 6 for advancing the strip forward and at least one flexible dragging member 8, which in the case in point is of the chain type.

The guide 6 extends along an advancing direction that is parallel to the longitudinal axis of the strip. In the case in point, in which the advancing direction F of the strip is horizontal, also the guide 6 extends in a horizontal direction. The advancing guide 6 is defined laterally by two running surfaces 7 that are parallel to one another and are provided to contain the longitudinal edge zone of the strip 1, i.e. the zone provided with the traction pins 3 and the opposing projections 5. The running surfaces 7 can be flat and vertical.

The flexible dragging member 8, which is prearranged for conveying forwards the strip 1 of containers, is looped in a closed ring. The active branch of the flexible dragging member is the top horizontal branch, which is located underneath the route of the strip 1 and on which the strip could rest. If the advancing route of the strip 1 is particularly long, a sequence of flexible members can be used that are arranged one after the other at a preset distance from one another so as to ensure the strip dragging along the entire route. Each flexible dragging member is movable in a direction that is parallel to the preset advancing direction F of the strip and has one or several thrust elements 9 prearranged to interact by contact with the traction pins 3. The thrust elements 9 are distributed along the dragging member, for example at a constant step, in such a way that at least one of them is always engaged with a traction pin 3 of the strip.

In the case in point, in which the advancing direction F of the strip is horizontal, the thrust elements 9 protrude vertically from the flexible dragging member 8, whilst the traction pins 3 and the opposing projections 5 protrude horizontally. When a thrust element 9 comes into contact with a traction pin 3, the opposing projection 5 associated with that pin interacts by contact with the running surface 7 facing the projection, so as to oppose the (horizontal) flexure of the strip 1 of containers due to the action of the thrust element 9. In order that the opposing action be effective, each opposing projection 5 could be placed slightly forward in relation to the advancing direction F, compared with the relative traction pin 3, at a short distance from the pin. Said distance could be shorter than twice the width of the advancing guide 6. In the case in point said distance is slightly shorter than the sum obtained adding the height of the traction pin 3 to the height of the opposing projection 5.

The width of the advancing guide 6, acting as an advancing seat, i.e. the horizontal distance between the two running surfaces 7, is substantially equal to or slightly greater than the horizontal distance, considered in a direction that is perpendicular to the advancing direction F, between the lateral ends (right and left) of a traction pin 3 and of the relative opposing projection 5.

The advancing device 4 can be applied in particular to convey the strip of containers along a tortuous and relatively very long route, within a cooling zone in which the filling material of the containers is cooled. The tortuous route of the strip inside the cooled environment of the refrigerator may, for example, comprise a long spirally shaped section.

The part of the strip that comprises the traction pins 3 and the opposing projections 5 can be intended to be subsequently eliminated by blanking in a terminal part of the strip route when said elements are no longer necessary for conveying the strip.

For each container, the prearrangement of a traction pin and of a opposing projection (the opposing projection being situated just after the traction pin on the opposite side of the strip) ensures efficient thrust interaction between the advancing device and the traction pin: in particular, the opposing projection 5 prevents the longitudinal edge zone of the strip to be subjected to horizontal flexure enough to disengage the traction pin 3 pushed by the thrust element 9.

Many different practical applicational modifications of constructional details may be applied to the invention without thereby leaving the scope of the inventive idea that is claimed below.

The invention claimed is:

1. Continuous strip of containers comprising:
   a plurality of containers extending stepwise one after another along longitudinal direction of the strip, so that corresponding points of two adjacent containers are separated by a step;
   said strip of containers having at least one longitudinal edge zone having a side from which traction pins protrude laterally, said pins being intended to interact in use by contact with an advancing device for advancing the strip;
   said strip comprising, for each of said traction pins, at least one corresponding opposing projection that protrudes from a further side of said at least one longitudinal edge zone, said further side being opposite to said side;
   wherein each said at least one corresponding opposing projection is arranged at a distance from its relative traction pin along said longitudinal direction, said distance being shorter than said step.

2. Strip according to claim 1, wherein said distance is shorter than half said step between the containers.

3. Strip according to claim 1, wherein said strip comprises, for each container, said at least one traction pin and said at least one corresponding opposing projection.

4. Strip according to claim 1, wherein both said traction pins and said opposing projections, are distributed with a step that is equal to said step between the containers.

5. Strip according to claim 1, wherein said at least one longitudinal edge zone of said strip is configured in a sinuous manner so as to alternate, with a step that is equal to said step between the containers, a full zone occupied by the material of said strip and an empty zone that is free of the material of said strip.

6. Strip according to claim 5, wherein each traction pin, and each relative opposing projection are both situated in the same full zone.

7. Strip according to claim 5 wherein each full zone has a traction pin and its relative opposing projection.

8. Method of advancing by means of an advancing device a strip of containers, said strip comprising a plurality of containers arranged one after another so that corresponding points of two adjacent containers are separated by a step, said strip having at least one longitudinal edge zone having a side from which traction pins protrude laterally at least one opposing projection being provided for each of said traction pins, each said at least one opposing projection protruding from a further side of said at least one longitudinal edge zone that is opposite to said side, said traction pins being intended to interact in use by contact with said advancing device, wherein said advancing device comprises:
   an advancing guide for advancing said strip in an advancing direction that is parallel to a longitudinal direction of said strip, said advancing guide being defined laterally by two running surfaces that are parallel to each other and are provided to contain said at least one longitudinal edge zone of said strip;
   at least one dragging member prearranged to push the strip of the containers in said advancing direction, said at least one dragging member being movable in a direction parallel to the advancing direction and having at least one thrust elements prearranged to interact by contact with the traction pins;
   wherein when one said traction pin contacts said at least one thrust element, the opposing projection associated with the one said traction pin contacts a running surface of said two running surfaces, that flexure of the strip of containers due to the action of the thrust element.

9. Method according to claim 8, wherein each opposing projection is located slightly forward, in relation to said advancing direction, compared with its relative traction pin, at a distance that is not shorter than the width of said advancing guide.

10. Method according to claim 8, wherein the width of said advancing guide defined by the distance between said two running surfaces, is substantially equal or slightly greater than the distance, considered in a direction that is perpendicular to the advancing direction, between the side ends of a traction pin and of the relative opposing projection.

* * * * *